(12) United States Patent
Zhang et al.

(10) Patent No.: US 12,486,927 B2
(45) Date of Patent: Dec. 2, 2025

(54) PRESS-FITTING CONNECTION STRUCTURE FOR PIPELINE AND REFRIGERATION DEVICE

(71) Applicant: NINGBO PUREY FLOW TECHNOLOGY CO., LTD., Zhejiang (CN)

(72) Inventors: Qihao Zhang, Zhejiang (CN); Jihong Zhang, Zhejiang (CN)

(73) Assignee: NINGBO PUREY FLOW TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 18/744,713

(22) Filed: Jun. 17, 2024

(65) Prior Publication Data

US 2024/0337336 A1    Oct. 10, 2024

Related U.S. Application Data

(63) Continuation of application No. PCT/CN2023/079936, filed on Mar. 6, 2023.

(30) Foreign Application Priority Data

Jan. 17, 2023  (CN) .......................... 202310061288.2

(51) Int. Cl.
*F16L 13/14*   (2006.01)
*F16L 13/16*   (2006.01)

(52) U.S. Cl.
CPC ............. *F16L 13/142* (2013.01); *F16L 13/16* (2013.01)

(58) Field of Classification Search
CPC ......... F16L 13/142; F16L 13/16; F16L 13/14; F16L 13/141
See application file for complete search history.

(56) References Cited

U.S. PATENT DOCUMENTS 6,805,385 B2 * 10/2004 Viegener ............... F16L 13/142
10,001,230 B2 *  6/2018 Rischen ................ F16L 13/142
(Continued)

FOREIGN PATENT DOCUMENTS

| CN | 107940147 A | 4/2018 |
| CN | 211667327 U | 10/2020 |
| CN | 112664731 A | 4/2021 |

OTHER PUBLICATIONS

International Search Report and Written Opinion for Corresponding PCT Application No. PCT/CN2023/079936.

*Primary Examiner* — William S. Choi

(57) ABSTRACT

A press-fitting connection structure for pipeline defines a first mounting groove for accommodating a retaining ring and a second mounting groove for accommodating a sealing ring, making the retaining ring and sealing ring be respectively mounted in different grooves and not easily to move. The first and second mounting grooves are spaced apart, so that the retaining ring will not come into contact with and scratch the sealing ring when the press-fitting connection structure for pipeline is subjected to the force of a press-fitting tool, thereby eliminating a closing ring originally used to protect the sealing ring, which makes assembly be more labor-saving and efficient. By means of setting a plurality of retaining teeth on the inner surface of the retaining ring, the retaining teeth can be more easily buried into the outer wall of the pipe through tip ends thereof, improving the tensile performance of the retaining ring.

20 Claims, 6 Drawing Sheets

(56) References Cited

U.S. PATENT DOCUMENTS

| | | | |
|---|---|---|---|
| 2009/0174182 A1* | 7/2009 | Duggan | F16L 13/142 |
| 2013/0119655 A1* | 5/2013 | Jamison | F16L 13/142 |
| 2013/0167357 A1* | 7/2013 | Arment | F16L 13/142 |
| 2015/0285420 A1* | 10/2015 | Stout | F16L 13/142 |
| 2020/0300395 A1* | 9/2020 | Paige | F16L 13/142 |

\* cited by examiner

PRESS-FITTING CONNECTION STRUCTURE FOR PIPELINE AND REFRIGERATION DEVICE

CROSS-REFERENCE TO RELATED APPLICATIONS

This application is a Continuation Application of PCT Application No. PCT/CN2023/079936, filed on Mar. 6, 2023, which claims the priority of Chinese patent application No. 202310061288.2, filed on Jan. 17, 2023, the entire contents of which are hereby incorporated by reference.

TECHNICAL FIELD

This application relates to the technical field of pipeline connection, and in particular to a press-fitting connection structure for pipeline and refrigeration device.

BACKGROUND

Traditional method for pipeline connection is to process external threads at connection ends of pipes, and the pipes are connected through the matching and connecting of the external threads and internal threads of pipe joints. Such connection method requires processing on the outer wall of the pipe. Due to the depth of the threads, the pipe needs to have a certain wall thickness to ensure that it can meet the requirements of strength and sealing performance after connection, which requires a large amount of material. Further, under the fluid pressure, the pipes connected through threaded connection are prone to loosening. Another method for pipeline connection is press-fitting connection, wherein the end of the pipe is inserted into the press-fitting joint and connected to the press-fitting joint through the press-fitting tool until the pipe and the press-fitting joints are clamped to deform. A sealing ring is set in the press-fitting joint, and shrinks to attach to the pipe tightly under the action of a press-fitting tool, thereby achieving sealing performance. However, fixing the pipes only by press-fitting has a limited reliability, and the press-fitting joint cannot firmly fasten the pipe when the fluid pressure is high, thereby the pipe being prone to slipping and detaching from the press-fitting joint. Further, in order to achieve fixation between the pipe and the press-fitting joint, it is required that the pipe and the press-fitting joint have a larger wall thickness, which increases production and processing costs.

Chinese utility model patent with a publication number of CN 211667327U discloses a press-fitting joint, which includes a scaling ring and a tubular-shaped pipe body, wherein an end of the pipe body has a press-fitting portion protruding radially and outwardly, the sealing ring abuts an end face of the pipe body and an outer face of the sealing ring abuts an inner face of the press-fitting portion, a retaining ring which is annular-shaped and provided with a cutout is provided inside the press-fitting portion, and a closing ring is provided inside the press-fitting portion and located between the retaining ring and the sealing ring. An outer diameter of the closing ring is less than an inner diameter of the press-fitting portion. An end of the press-fitting portion has a flange protruding radially and inwardly, for abutting of the retaining ring thereon. An inner face of the retaining ring has a latching portion protruding radially and inwardly. In this technical solution, by means of setting a retaining ring inside the press-fitting joint, the retaining ring shrinks under force to cause the retaining teeth to fit into the outer wall of the pipe to be connected, thereby achieving the purpose of locking and improve the tensile performance. Among them, the closing ring plays a role in blocking the retaining ring, avoiding contact between the retaining ring and the sealing ring and damaging the sealing ring. The retaining ring, closing ring, and sealing ring form a structure in a manner of three body and one groove, and the flange plays a role in blocking the axial, outward movement of the retaining ring.

Therefore, a purpose of this disclosure is to provide a new press-fitting connection structure for pipeline, which is based on a new working principle to achieve press-fitting connection of the pipeline. For the press-fitting connection structure for pipeline proposed in this disclosure, the retaining ring and the sealing ring are respectively mounted in different grooves, and thus there is no need for a closing ring to protect the sealing ring. Further, it can be suitable for connecting pipes of smaller diameter. Further, it can withstand fluid pressure of at least 100 kgf/cm$^2$, with outstanding comprehensive tensile performance.

SUMMARY

A technical problem to be solved by this application is to provide a press-fitting connection structure for pipeline that adopts a new working principle, wherein a retaining ring and a scaling ring are respectively mounted in different grooves, without a need for mounting additional closing ring to protect the scaling ring. In addition, this can be applied to small diameter pipes connections as well as large diameter pipes. In addition, a refrigeration device is provided, and a pipeline of the refrigeration device includes this press-fitting connection structure for pipeline.

This application provides a press-fitting connection structure for pipeline, which includes a tubular-shaped connecting body for connecting pipes. A first mounting groove and a second mounting groove are defined in an inner surface of the connecting body, arranged in sequence along an axial direction and spaced from each other. A scaling ring is mounted in the first mounting groove, a retaining ring is mounted in the second mounting groove, and an axial position of the retaining ring is limited by the second mounting groove. A plurality of retaining teeth is provided on an inner surface of the retaining ring, and each of the plurality of retaining teeth has a tip end arranged toward an inner side. During press-fitting, the connecting body is mounted around and sealed with the pipe through the sealing ring, and the retaining teeth of the retaining ring are buried into a wall of the pipe through tip ends.

In this technical solution, the press-fitting connection structure for pipeline includes a tubular-shaped connecting body for connecting pipes, wherein the press-fitting connection structure for pipeline may be a press-fitting joint, a pipe clamp, and etc. The connecting body is mounted around and connected to the pipe through an end thereof, and a sealing ring and a retaining ring are set inside the connecting body. When a clamping tool acts on the connecting body, the sealing ring is attached to the outer wall of the pipe, and sealing connection between the pipes is achieved through the connecting body, so as to prevent a gap between the pipe and the connecting body. The retaining ring shrinks and is buried into the outer wall of the pipe through its retaining teeth to clamp the pipe tightly. The retaining tooth is set with a tip end arranged toward an inner side, and can more easily buried into the outer wall of the pipe through the tip end, making it impossible for the pipe to slip off, improving a connection reliability of the press-fitting connection structure for pipeline (thus able to withstand larger fluid pressure), preventing the pipe from slipping and detaching from the connecting body, improving the tensile performance. By means of setting the first mounting groove for installing the scaling ring and the second mounting groove for installing the retaining ring respectively on the inner wall of the connecting body, the first mounting groove and the second mounting groove make the scaling ring and snap retaining be respectively set in different grooves, and thus the sealing ring and retaining ring are not easily to move when subjected to force. The first mounting groove and the second mounting groove are spaced apart, so that the retaining ring will not come into contact with and scratch the sealing ring when the press-fitting connection structure for pipeline is subjected to the force of a press-fitting tool. Therefore, there is no need to install a closing ring between the sealing ring and the retaining ring for protecting the scaling ring, which is different from the conventional three ring-bodies and one groove structure constructed by the retaining ring, closing ring and scaling ring. Further, the retaining ring is mounted in the second mounting groove, and there is no need to from a flange at the end portion of the connecting body for limiting a position of the retaining ring.

Further, the second mounting groove is set close to an end portion of the connecting body, and located between the end portion of the connecting body and the first mounting groove.

In this technical solution, the second mounting groove is set close to an end portion of the connecting body, and located between the end portion of the connecting body and the first mounting groove. The retaining ring is more outward than the sealing ring, and the sealing ring is located at the inner side of the retaining ring, so that it is not easy to affect the sealing of the sealing ring to the connecting body when the retaining ring is tightly clamped with the outer wall of the connecting body, and the fluid is blocked by the sealing ring and cannot contact the retaining ring when it passes through an interior of the connecting body, thereby prolonging the service life of the retaining ring. The first mounting groove is set close to the second mounting groove, so that the press-fitting tool can act on the first mounting groove and the second mounting groove synchronously. This press-fitting connection structure for pipeline may adapt to common press-fitting tools on the market, reducing the user's usage cost.

Further, a protective ring is mounted at the end portion of the connecting body for covering the retaining teeth laterally.

In this technical solution, inserting of the pipe into the connecting body needs to pass through the retaining ring. When the press-fitting tool is not used, an inner diameter at a pipe mouth of the connecting body is greater than the outer diameter of the pipe, and thus an inserting angle of the pipe is prone to deviation, and thus the sharp corner of the retaining tooth on the inner surface of the retaining ring is prone to scratching the outer wall of the pipe. By means of setting a protective ring at the end portion of the connecting body, the pipe is inserted into the connecting body under the guiding of the protective ring, so as to avoid scratching of the outer wall of the pipe by the sharp corner of the retaining tooth, and correct the inserting angle of the pipe, making the pipe be difficult to be scratched by the sharp corner of the retaining teeth when it is inserted, thereby preventing the pipe from leaking.

Further, an inner diameter of the protective ring is smaller than an inner diameter of the retaining ring.

In this technical solution, the protective ring is mounted at the end portion of the connecting body, wherein a portion of the protective ring is located inside the connecting body for guiding the installation of the pipe, and an inner diameter of this portion of the protective ring is taken as the inner diameter of the entire protective ring. An inner diameter of the retaining ring depends on a protruding height of the retaining tooth on its inner surface. By means of setting the inner diameter of protective ring to be smaller than that of the retaining ring, under the action of the protective ring, there is a gap between the pipe and outer surfaces of the retaining teeth during inserting of the pipe, and the sharp corners of the retaining teeth is blocked to protect the pipe from being scratched by the retaining teeth.

Further, the plurality of retaining teeth is continuously and uniformly distributed along a circumferential direction of the retaining ring.

In this technical solution, the plurality of retaining teeth is continuously and uniformly distributed along the circumferential direction of the retaining ring. In this way, there is a full circle of retaining teeth distributed on the inner surface of the retaining ring. The plurality of retaining teeth is distributed on the inner surface of the retaining ring closely, and a space between adjacent retaining teeth is small. When the pipe is inserted into and the press-fitting tool acts on the press-fitting connection structure for pipeline, the retaining ring shrinks under the force of the press-fitting tool, the plurality of teeth on the inner surface of the retaining ring are buried into the outer wall of the pipe under force to achieve fixation (thus a working principle is different from that of related art). A holding force of the plurality of teeth which is evenly distributed along the circumferential direction is relatively large, improving the tensile performance of the retaining ring. Further, the retaining ring is clamped onto the pipe through the full circle of retaining teeth, and thus a thickness of the retaining ring can be reduced, thereby being well applied to the pipe with small diameter, and of course, also being applied to large pipes, and has outstanding comprehensive tensile performance.

Further, the tip end of the retaining tooth extends along an axial direction of the retaining ring.

In this technical solution, the retaining teeth are distributed circumferentially on the inner surface of the retaining ring as a full circle. A length direction of the tip end of the retaining teeth is parallel to the axial direction of the retaining ring, thus the inner surface of the retaining ring can accommodate more retaining teeth, improving the tensile performance of the retaining ring.

Further, a cutout is defined in the retaining ring, making the retaining ring be C-shaped.

In this technical solution, the retaining ring is installed inside the connecting body, which is used to connect and fix the pipe. A head portion of the press-fitting connection structure for pipeline is tubular-shaped, setting the cutout on the retaining ring can make it easier and faster to be mounted into the second mounting groove, and the retaining ring has a certain amount of movement for the cutout when it is subjected to the force of the press-fitting tool.

Further, an enlarged opening is defined at an end portion of the connecting body, and the second mounting groove is located at the enlarged opening.

In this technical solution, the pipe is inserted into the connecting body through the end portion of the connecting body. If a difference in diameter between the pipe and the end portion of the connecting body is small, it will be difficult to assemble. In this technical solution, considering the difficulty of assembly, an enlarged opening is set at the end portion of the connecting body to enlarge the diameter of the end portion of the connecting body, making it easier and faster to insert the pipe into the connecting body.

Further, an annular protrusion is provided inside the connecting body for controlling a length of the pipe inserted into the connecting body.

In this technical solution, two pipes are respectively inserted into two ends of the connecting body to achieve connection. After inserting of the pipe into the connecting body, an end portion of the pipe abuts against the annular protrusion to achieve installation limit, preventing one pipe from being inserted too long and affecting the installation of the other pipe. The annular protrusion is simple in structure and convenient to produce.

This application provides a refrigeration device which includes a refrigeration pipeline, wherein the refrigeration pipeline includes any one of the above press-fitting connection structures for pipeline.

At present, most refrigeration pipelines of the refrigeration device use copper pipes with smaller diameters. The press-fitting connection structure used for copper pipes is mostly a pipe clamp with a closing ring arranged at an end thereof, and the closing ring and the pipe clamp are formed integrally. Through the press-fitting tool, the closing ring is deformed inward and forms a certain inclination angle with the outer wall of the pipe under the press-fitting force. The closing ring is fixed to the pipe by the principle of inverted hook through the inclined angle. Due to the small diameter of the copper pipes used in refrigeration pipelines, the diameter of the press-fitting joint is relatively small, so that the process of setting a closing ring on an inner wall of an end portion of the press-fitting joint to fix the pipe is difficult and the yield is low. In this technical solution, the press-fitting connection structure for pipeline is provided with a retaining ring with a plurality of retaining teeth, and thus uses the retaining teeth of the retaining ring to hold the pipe tightly, improving the tensile performance of the press-fitting connection structure for pipeline. A thickness of the retaining ring itself is small, which will not affect the diameter of the press-fitting connection structure for pipeline. The retaining ring and the press-fitting connection structure for pipeline are formed separately, reducing the difficulty of the production process and the production costs.

The present application provides a press-fitting connection structure for pipeline and a refrigeration device, wherein the press-fitting connection structure for pipeline defines a first mounting groove for accommodating a sealing ring and a second mounting groove for accommodating a retaining ring, so that the sealing ring and the retaining ring can be respectively mounted in different grooves and are not easily to move. The first mounting groove and the second mounting groove are spaced apart, so that the retaining ring will not come into contact with the sealing ring and scratch the sealing ring when the press-fitting connection structure for pipeline is subjected to the force of the press-fitting tool, thereby eliminating the closing ring originally used to protect the sealing ring, which makes assembly be more labor-saving and efficient. By means of setting a plurality of retaining teeth on the inner surface of the retaining ring, the retaining teeth can be more easily buried into the outer wall of the pipe through the tip ends thereof, improving the tensile performance of the retaining ring. The retaining ring can clamp the pipe tightly through the full circle of teeth, and thus a thickness of the retaining ring can be reduced, which can be well applied to the pipes of small diameter, and of course, can be also applied to large pipes, and has outstanding comprehensive tensile performance.

Figure 1:
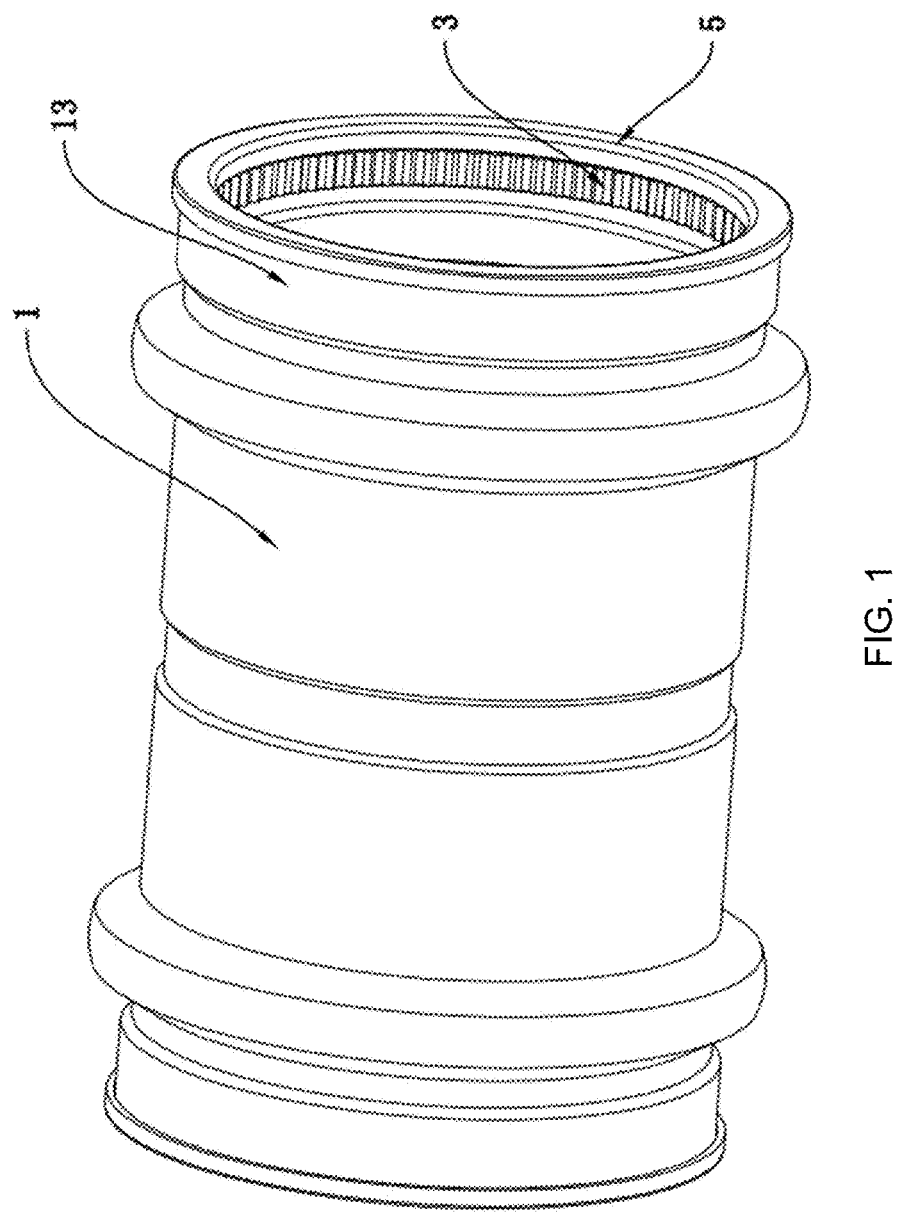
FIG. 1 is a schematic, structural view of a press-fitting connection structure for pipeline of this disclosure.

In the figures:
1, connecting body;
11, first mounting groove;
12, second mounting groove;
13, enlarged opening;
14, annular protrusion;
2, sealing ring;
3, retaining ring;
31, retaining tooth;
311, tip end;
32, cutout;
4, pipe; and
5, protective ring.

DESCRIPTION OF THE EMBODIMENTS

For better understanding the present application, more detailed description of various aspects of this application will be provided with reference to the append drawings. It should be understood that these detailed description are only description of exemplary embodiments of the present application, and do not limit the scope of the present application in any way. In the whole specification, the same reference numbers refer to the same components.

In the attached drawings, for the sake of description, the thickness, size, and shape of the object have been slightly exaggerated. The attached drawings are only an example and not strictly drawn to scale.

It should also be understood that the terms "includes/include/including", "comprises/comprise/comprising", "has/have/having", used in this specification indicate the existence of the described features, structure, step, operation, component, and/or member, but do not exclude the existence or addition of one or more other features, structure, step, operation, component, member, and/or their combination.

Embodiment 1

As shown in FIG. 1 to FIG. 6, this application discloses a press-fitting connection structure for pipeline and a refrigeration device, which includes a tubular-shaped connecting body 1. The press-fitting connection structure for pipeline may be a press-fitting joint or a pipe clamp, etc. The connecting body 1 is mounted around and connected to a pipe 4 through an end thereof, and a sealing ring 2 and a retaining ring 3 are set in the connecting body 1. The connecting body 1 is mounted around and sealed with an outer wall of the pipe 4 through the sealing ring 2. An inner surface of the retaining ring 3 is provided with a plurality of retaining teeth 31, and the pipe 4 is fixed by the retaining ring 3 through burying of the retaining teeth 31 into the outer wall of the pipe 4. When a press-fitting tool acts on the connecting body 1, the scaling ring 2 is mounted around and sealed with the outer wall of the pipe 4, and scaling connection between the pipes 4 is achieved by the connecting body 1, so as to prevent a gap between the pipe 4 and the connecting body 1. Each of the retaining teeth 31 includes a tip end 311 arranged toward an inner side. During press-fitting, the retaining ring 3 clamps the pipe 4 tightly through burying of the tip ends 311 of the retaining teeth 31 into the outer wall of the pipe 4, so as to prevent the pipe 4 from slipping and detaching from the connecting body 1, improving the tensile performance.

Figure 2:
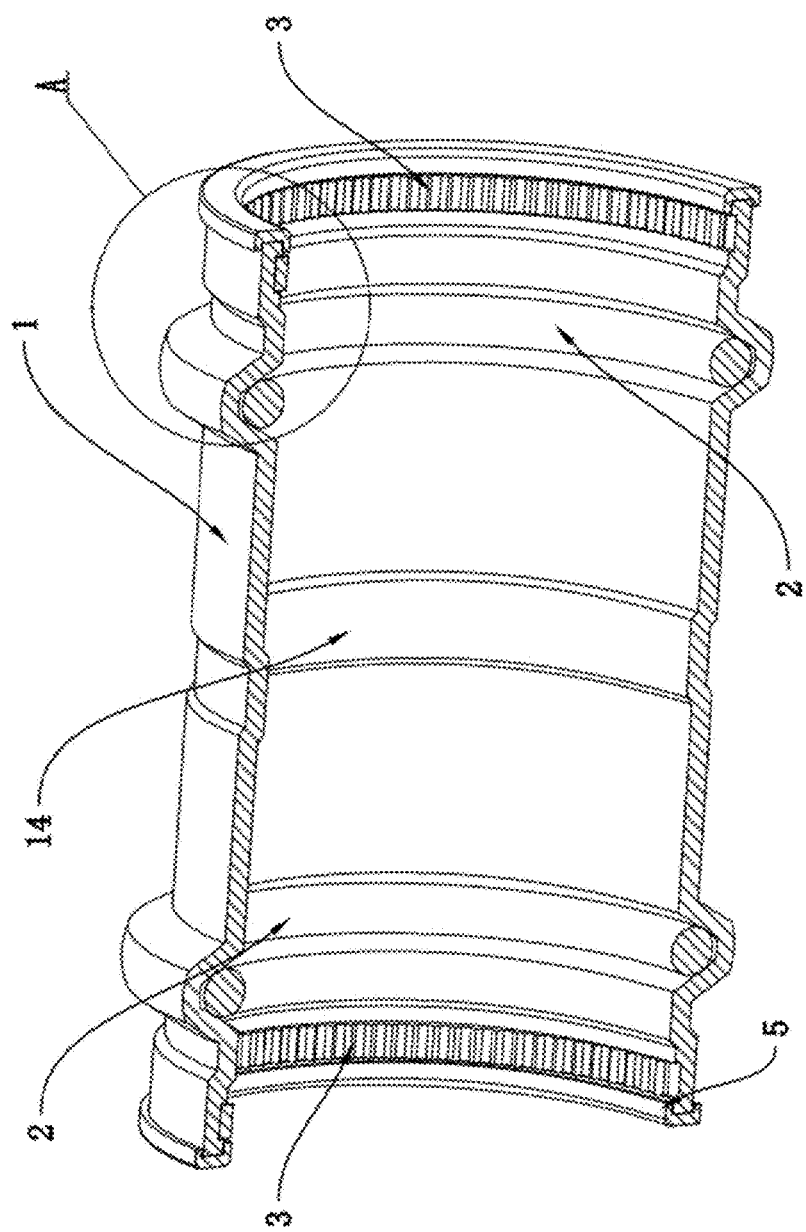
FIG. 2 is a schematic, cross-sectional view of a press-fitting connection structure for pipeline of this disclosure.
Figure 4:
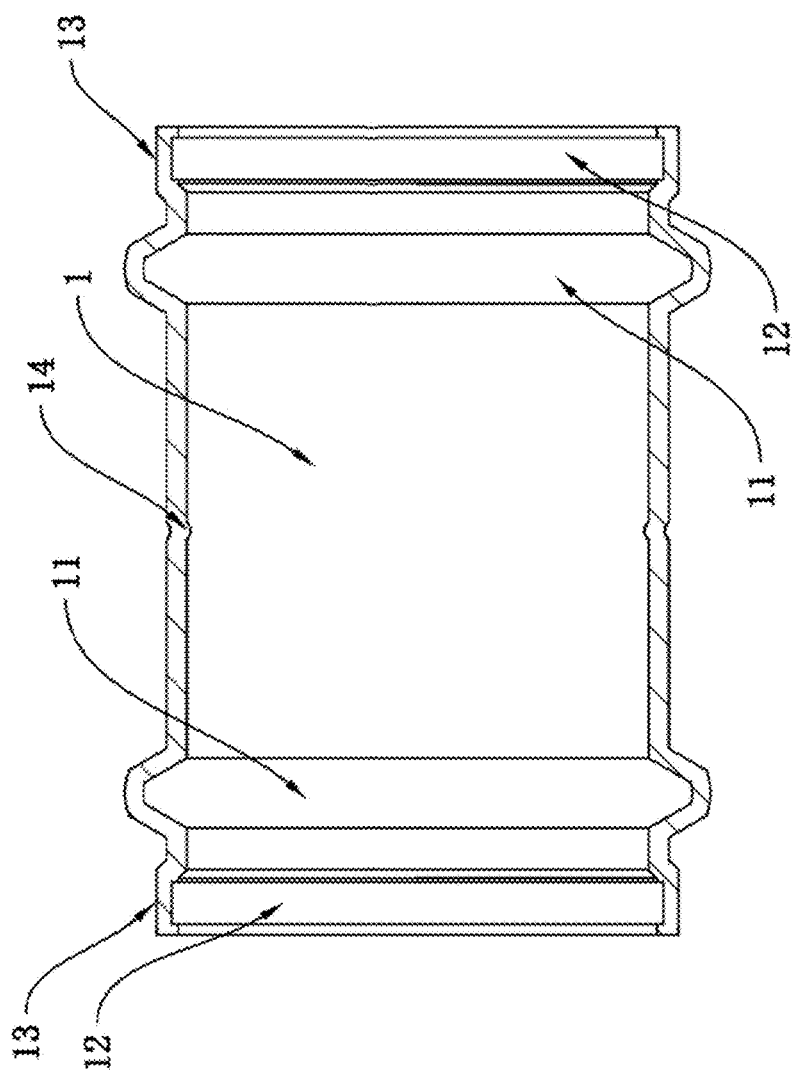
FIG. 4 is a schematic, cross-sectional view of a connecting body of this disclosure.

As shown in FIG. 2 and FIG. 4, an inner wall of the connecting body 1 defines a first mounting groove 11 and a second mounting groove 12 which are arranged in sequence along the axial direction and spaced from each other. The sealing ring 2 is mounted in the first mounting groove 11, and the retaining ring 3 is mounted in the second mounting groove 12. The second mounting groove 12 limits an axial position of the retaining ring 3. The first mounting groove 11 and the second mounting groove 12 make the sealing ring 2 and the retaining ring 3 be respectively arranged in different grooves, and thus the sealing ring 2 and the retaining ring 3 are not easily to move when subjected to force. The first mounting groove 11 and the second mounting groove 12 are spaced apart, so that the sealing ring 2 and the retaining ring 3 cannot come into contact due to the obstruction of their respective mounting grooves when the sealing ring 2 and the retaining ring 3 deform due to the force of the press-fitting tool, which prevents the sealing ring 2 from being scratched by the retaining ring 3. Therefore, there is no need to install a closing ring between the sealing ring 2 and the retaining ring 3 for protecting the scaling ring 2, which is different from the conventional three ring-bodies and one groove structure constructed by the retaining ring, closing ring and scaling ring. Further, the retaining ring 3 is mounted in the second mounting groove 12, and there is no need to from a flange at the end portion of the connecting body 1 for limiting a position of the retaining ring 3.

As shown in FIG. 4, the second mounting groove 12 is set close to the end portion of the connecting body 1, and is located between the end portion of the connecting body 1 and the first mounting groove 11. The retaining ring 3 is more outward than the sealing ring 2, and the sealing ring 2 is located at the inner side of the retaining ring 3, so that it is not easy to affect the scaling of the sealing ring 2 to the connecting body 1 when the retaining ring 3 is tightly clamped with the outer wall of the connecting body 1, and the fluid is blocked by the sealing ring 2 and cannot contact the retaining ring 3 when it passes through an interior of the connecting body 1, thereby prolonging the service life of the retaining ring 2. The first mounting groove 11 is set close to the second mounting groove 12, so that the press-fitting tool can act on the first mounting groove 11 and the second mounting groove 12 synchronously. This press-fitting connection structure for pipeline may adapt to common press-fitting tools on the market, reducing the user's usage cost.

More specifically, when the common press-fitting tool is applied to the press-fitting connection structure for pipeline, both the sealing ring 2 and the retaining ring 3 are subjected to the press-fitting force and tightly hold the outer wall of the pipe 4. The press-fitting connection structure for pipeline is subjected to force and deformation are generated at two sides of the first mounting groove 11 to form a hexagonal structure, with one side being the location of the second mounting groove 12. This end is fixedly connected to the pipe 4 through two hexagonal structures, which is stable in structure and the pipe 4 is difficult to slide. Further, two ends of the press-fitting connection structure for pipeline each are provided with a first mounting groove 11 and a second mounting groove 12, and thus the two ends can connect and fix the pipes 4, which is stable in structure. It should be noted that the press-fitting connection structure for pipeline may be provided with multiple first mounting grooves 11 and one second mounting groove 12, and the number of the first mounting groove(s) 11 and second mounting groove(s) 12 is not limited in this application.

As shown in FIG. 2, a protective ring 5 is mounted at the end portion of the connecting body 1, for covering the retaining teeth 31 laterally. Inserting of the pipe 4 into the connecting body 1 needs to pass through the retaining ring 3. When the press-fitting tool is not used, an inner diameter at a pipe mouth of the connecting body 1 is greater than the outer diameter of the pipe 4, and thus an inserting angle of the pipe 4 is prone to deviation, and thus the sharp corner of the retaining tooth 31 on the inner surface of the retaining ring 3 is prone to scratching the outer wall of the pipe 4. That is, the retaining teeth 31 and the outer wall of the pipe 4 are prone to scratching. By means of setting a protective ring 5 at the end portion of the connecting body 1, the pipe 4 is inserted into the connecting body 1 under the guiding of the protective ring 5, so as to avoid scratching of the outer wall of the pipe 4 by the sharp corner of the retaining tooth 31, and correct the inserting angle of the pipe 4, making the pipe 4 be difficult to be scratched by the sharp corner of the retaining teeth 31 when it is inserted, thereby preventing the pipe 4 from leaking.

Figure 3:
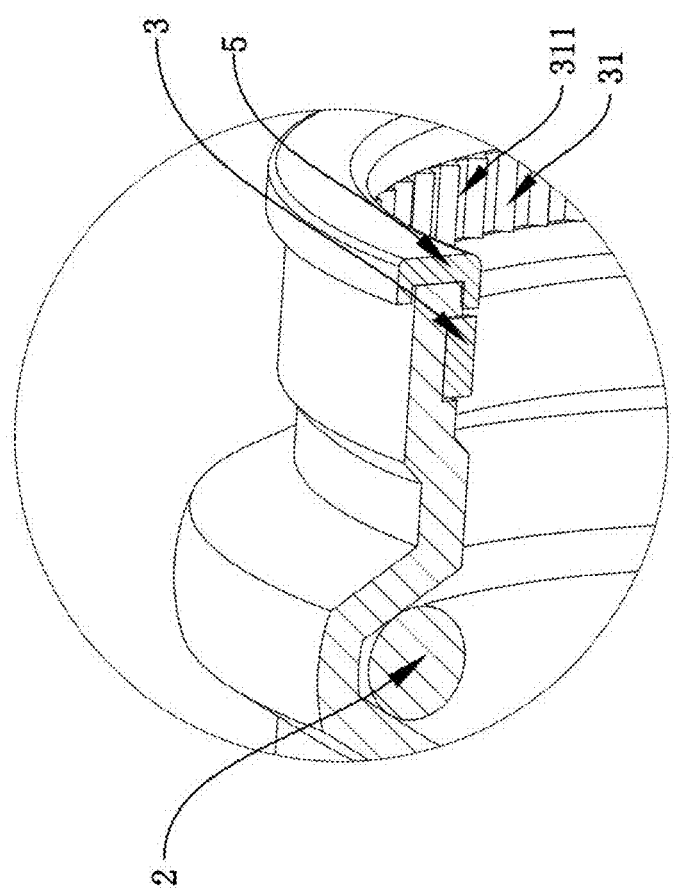
FIG. 3 is a schematic, partially enlarged view of part A of FIG. 2 of this disclosure.

As shown in FIG. 3, more specifically, an inner diameter of the protective ring 5 is smaller than that of the retaining ring 3. The protective ring 5 is mounted at the end portion of the connecting body 1, wherein a portion of the protective ring 5 is located inside the connecting body 1 for guiding the installation of the pipe 4, and thus an inner diameter of this portion of the protective ring 5 is taken as the inner diameter of the entire protective ring 5. An inner diameter of the retaining ring 3 depends on a protruding height of the retaining tooth on its inner surface. By means of setting the inner diameter of protective ring 5 to be smaller than that of the retaining ring 3, under the action of the protective ring 5, there is a gap between the pipe 4 and outer surfaces of the retaining teeth 31 during inserting of the pipe 4, and the sharp corners of the retaining teeth 31 is blocked to protect the pipe 4 from being scratched by the retaining teeth 31.

Figure 5:
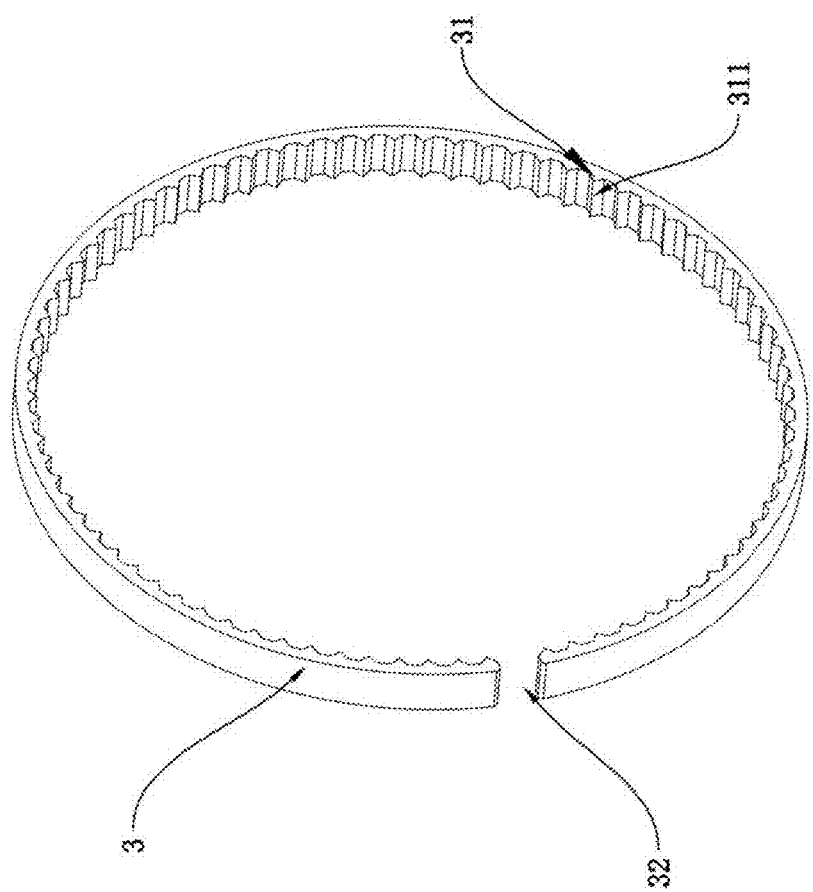
FIG. 5 is a schematic, structural view of a retaining ring of this disclosure.

As shown in FIG. 5, the plurality of retaining teeth 31 is continuously and uniformly distributed along a circumferential direction of the retaining ring 3. In this way, there is a full circle of retaining teeth 31 distributed on the inner surface of the retaining ring 3. The plurality of retaining teeth 31 is distributed on the inner surface of the retaining ring 3 closely, and a space between adjacent retaining teeth 31 is small. When the pipe 4 is inserted into and the press-fitting tool acts on the press-fitting connection structure for pipeline, the retaining ring 3 shrinks under the force of the press-fitting tool, the plurality of teeth 31 on the inner surface of the retaining ring 3 are buried into the outer wall of the pipe 4 under force to achieve fixation. A holding force of the plurality of teeth 31 which is evenly distributed along the circumferential direction is relatively large, improving the tensile performance of the retaining ring 3. Further, the retaining ring 3 is clamped onto the pipe 4 through the full circle of retaining teeth 31, and thus a thickness of the retaining ring 3 can be reduced, thereby being well applied to the pipe 4 with small diameter.

As shown in FIG. 5, the retaining tooth 31 is an inverted, V-shaped protrusion. By means of setting the retaining tooth 31 to be inverted, V-shaped, a top of the inverted, V-shaped retaining tooth 31 is configured as a tip end 311. When subjected to the force of the press-fitting tool, the tip end 311 at the top can be buried into the outer wall of the pipe 4, resulting in better clamping effect and better tensile performance. In addition, the inverted, V-shaped protrusion is simple in structure, and a difficulty of processing and production is low.

As shown in FIG. 5, the tip end 311 of the retaining tooth 31 extends along the axial direction of the retaining ring 3, and the retaining teeth 31 are distributed circumferentially on the inner surface of the retaining ring 3 as a full circle. A length direction of the tip end 311 of the retaining teeth 31 is parallel to the axial direction of the retaining ring 3, thus the inner surface of the retaining ring 3 can accommodate more retaining teeth 31, improving the tensile performance of the retaining ring 3.

As shown in FIG. 5, the retaining ring 3 is provided with a cutout 32, which makes the retaining ring 3 be C-shaped. The retaining ring 3 is installed inside the connecting body 1, which is used to connect and fix the pipe 4. A head portion of the press-fitting connection structure for pipeline is tubular-shaped, setting the cutout 32 on the retaining ring 3 can make it easier and faster to be mounted into the second mounting groove 12, and the retaining ring has a certain amount of movement for the cutout 32 when it is subjected to the force of the press-fitting tool.

As shown in FIG. 1 and FIG. 2, the end portion of the connecting body 1 is provided with an enlarged opening 13, and the second mounting groove 12 is located at the enlarged opening 13. The pipe 4 is inserted into the connecting body 1 through the end portion of the connecting body 1. If a difference in diameter between the pipe 4 and the end portion of the connecting body 1 is small, it will be difficult to assemble. In this technical solution, considering the difficulty of assembly, an enlarged opening 13 is set at the end portion of the connecting body 1 to enlarge the diameter of the end portion of the connecting body 1, making it easier and faster to insert the pipe 4 into the connecting body 1.

More specifically, due to the thickness of the retaining ring 3 is smaller, the second mounting groove 12 located at the enlarged opening 13 is actually a shallow groove, which can be formed on the connecting body 1 by machining. The second mounting groove 12 is easy to process, and the installation of the retaining ring 3 is fast and convenient.

Figure 6:
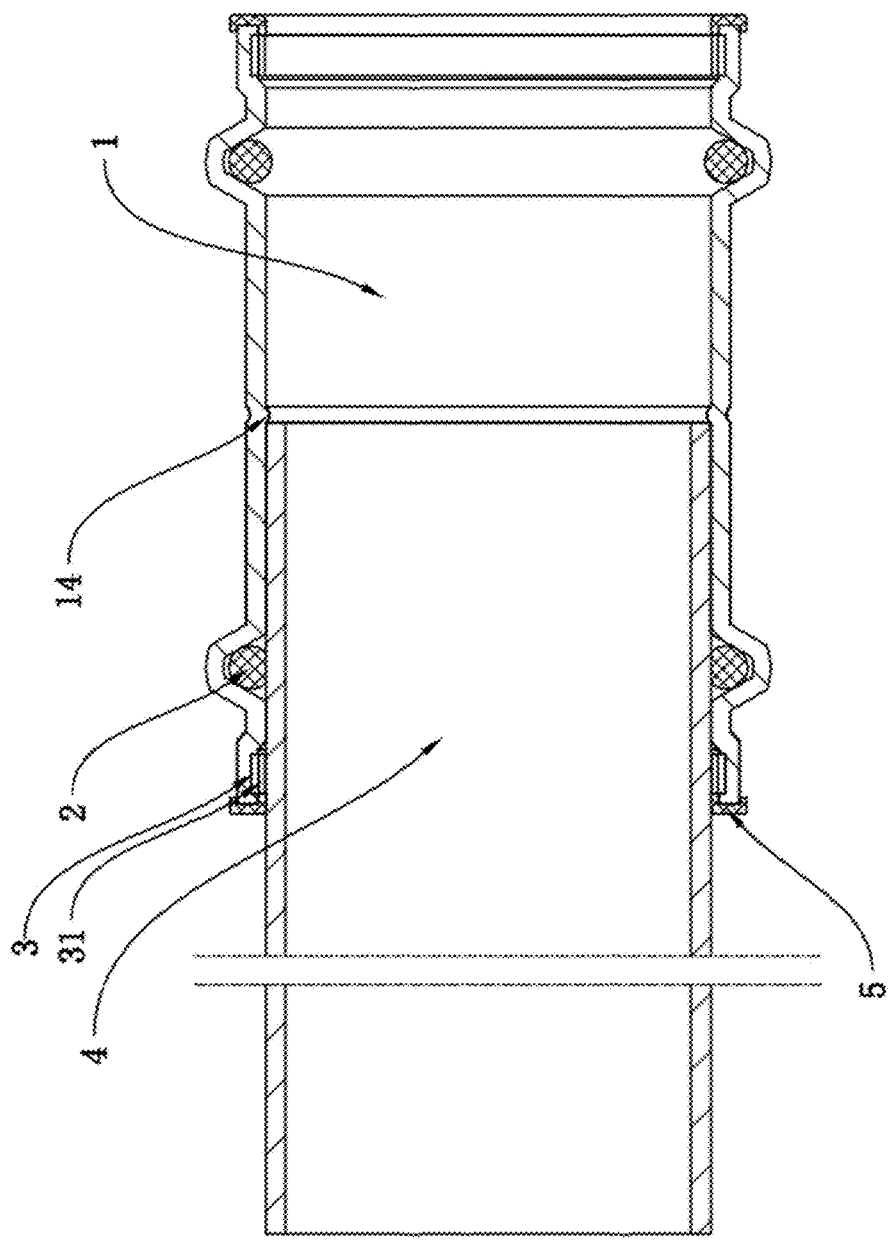
FIG. 6 is schematic, cross-sectional view of the installation of a pipe in the press-fitting connection structure for pipeline of this disclosure.

As shown in FIG. 6, an annular protrusion 14 is formed inside the connecting body 1, for controlling a length of the pipe 4 inserted into the connecting body 1. Two pipes 4 are respectively inserted into two ends of the connecting body 1 to achieve connection. After inserting of the pipe 4 into the connecting body 1, an end portion of the pipe 4 abuts against the annular protrusion 14 to achieve installation limit, preventing one pipe 4 from being inserted too long and affecting the installation of the other pipe 4. The annular protrusion 14 is simple in structure and convenient to produce.

Embodiment 2

Based on Example 1, this embodiment provides a refrigeration device, which may be an air conditioner. The refrigeration device includes a refrigeration pipeline, which includes a plurality of copper pipes. The plurality of copper pipes are connected and communicated with each other through the press-fitting connection structure for pipeline described in Example 1. For the press-fitting connection structure for pipeline, by means of setting a retaining ring 3 with a plurality of retaining teeth 31, it uses the retaining teeth 31 of the retaining ring 3 to clamp the pipe 4 tightly to improve its tensile performance. The retaining ring 3 itself has a smaller thickness and will not affect the diameter of the press-fitting connection structure for pipeline. The retaining ring 3 and the press-fitting connection structure for pipeline are produced separately, reducing the difficulty of the production process and lowering production costs.

The present disclosure describes a press-fitting connection structure for pipeline and a refrigeration device, wherein the press-fitting connection structure for pipeline defines a first mounting groove 11 for accommodating a sealing ring 2 and a second mounting groove 12 for accommodating a retaining ring 3, so that the sealing ring 2 and the retaining ring 3 can be respectively mounted in different grooves and are not easily to move. The first mounting groove 11 and the second mounting groove 12 are spaced apart, so that the retaining ring 3 will not come into contact with the sealing ring 2 and scratch the sealing ring 2 when the press-fitting connection structure for pipeline is subjected to the force of the press-fitting tool, thereby eliminating the closing ring originally used to protect the sealing ring 2, which makes assembly be more labor-saving and efficient. By means of setting a plurality of retaining teeth 31 on the inner surface of the retaining ring 3, the retaining teeth 31 can be more easily buried into the outer wall of the pipe 4 through the tip ends 311 thereof, improving the tensile performance of the retaining ring 3. The retaining ring 3 can clamp the pipe 4 tightly through the full circle of teeth 31, and thus a thickness of the retaining ring 3 can be reduced, thereby reducing production costs and processing difficulties, which can be well applied to the pipes 4 of small diameter, and of course, can be also applied to large pipes 4.

This application is not limited to the above preferred embodiments, anyone can derive various other forms of products under the inspiration of this application, but regardless of any changes in its shape or structure, any technical solution that is the same or similar to this application falls within the protection scope of this application.

What is claimed is:

1. A press-fitting connection structure for pipeline, comprising a tubular-shaped connecting body for connecting pipes, wherein
a first mounting groove and a second mounting groove are defined in an inner surface of the connecting body, arranged in sequence along an axial direction and spaced from each other,
a sealing ring is mounted in the first mounting groove, a retaining ring is mounted in the second mounting groove, an axial position of the retaining ring is limited by the second mounting groove, a plurality of retaining teeth is provided on an inner surface of the retaining ring, and each of the plurality of retaining teeth comprises a tip end arranged toward an inner side,
a protective ring is mounted at an end portion of the connecting body for guiding an installation of the one of the pipes into the connecting body, wherein an inner diameter of the protective ring is smaller than a diameter of a circle defined by the tip ends of the retaining teeth of the retaining ring,
during press-fitting, the connecting body is mounted around and sealed with one of the pipes through the sealing ring, and the retaining teeth of the retaining ring are buried into a wall of the one of the pipes through the tip ends.

2. The press-fitting connection structure for pipeline according to claim 1, wherein the second mounting groove is located between the end portion of the connecting body and the first mounting groove.

3. The press-fitting connection structure for pipeline according to claim 1, wherein the plurality of retaining teeth are uniformly distributed along a circumferential direction of the retaining ring.

4. The press-fitting connection structure for pipeline according to claim 3, wherein the tip end of each retaining tooth extends along an axial direction of the retaining ring.

5. The press-fitting connection structure for pipeline according to claim 3, wherein a cutout is defined in the retaining ring, making the retaining ring be C-shaped.

6. The press-fitting connection structure for pipeline according to claim 1, wherein an enlarged opening is defined at the end portion of the connecting body, and the second mounting groove is located at the enlarged opening.

7. The press-fitting connection structure for pipeline according to claim 1, wherein an annular protrusion is provided inside the connecting body for controlling a length of the one of the pipes inserted into the connecting body.

8. The press-fitting connection structure for pipeline according to claim 1, wherein a cross section of the protective ring is U-shaped, and a portion of the protective ring is located inside the connecting body and defines the inner diameter of the protective ring.

9. The press-fitting connection structure for pipeline according to claim 8, wherein a gap is defined between the one of the pipes and the tip ends of the the retaining teeth during installation of the one of the pipes into the connecting body.

10. The press-fitting connection structure for pipeline according to claim 1, wherein an inner diameter of the connecting body at a position corresponding to the first mounting groove is larger than that of the connecting body at a position corresponding to the second mounting groove, and an outer diameter of the sealing ring is larger than that of the retaining ring.

11. A refrigeration device, comprising a refrigeration pipeline, wherein the refrigeration pipeline comprises a press-fitting connection structure for pipeline as defined in claim 1.

12. A refrigeration device, comprising a refrigeration pipeline, wherein the refrigeration pipeline comprises a press-fitting connection structure for pipeline as defined in claim 2.

13. A refrigeration device, comprising a refrigeration pipeline, wherein the refrigeration pipeline comprises a press-fitting connection structure for pipeline as defined in claim 3.

14. A refrigeration device, comprising a refrigeration pipeline, wherein the refrigeration pipeline comprises a press-fitting connection structure for pipeline as defined in claim 4.

15. A refrigeration device, comprising a refrigeration pipeline, wherein the refrigeration pipeline comprises a press-fitting connection structure for pipeline as defined in claim 5.

16. A refrigeration device, comprising a refrigeration pipeline, wherein the refrigeration pipeline comprises a press-fitting connection structure for pipeline as defined in claim 6.

17. A refrigeration device, comprising a refrigeration pipeline, wherein the refrigeration pipeline comprises a press-fitting connection structure for pipeline as defined in claim 7.

18. A refrigeration device, comprising a refrigeration pipeline, wherein the refrigeration pipeline comprises a press-fitting connection structure for pipeline as defined in claim 8.

19. A refrigeration device, comprising a refrigeration pipeline, wherein the refrigeration pipeline comprises a press-fitting connection structure for pipeline as defined in claim 9.

20. A refrigeration device, comprising a refrigeration pipeline, wherein the refrigeration pipeline comprises a press-fitting connection structure for pipeline as defined in claim 10.

\* \* \* \* \*